United States Patent [19]

Reynolds et al.

[11] Patent Number: 5,299,297
[45] Date of Patent: Mar. 29, 1994

[54] METHOD FOR ENHANCING THREE-DIMENSIONAL INTERFERENCE CHECKING

[75] Inventors: David C. Reynolds, Boulder; Michael Wong, Longmont, both of Colo.

[73] Assignee: International Business Machines Corporation, Armon, N.Y.

[21] Appl. No.: 142,896

[22] Filed: Jan. 11, 1988

[51] Int. Cl.$^5$ .............................. G06F 15/62
[52] U.S. Cl. ..................... 395/121; 395/119; 395/120; 395/133
[58] Field of Search ............... 364/521, 522, 518; 340/729; 395/119, 120, 121, 133, 134

[56] References Cited

U.S. PATENT DOCUMENTS

| | | | |
|---|---|---|---|
| 3,889,107 | 6/1975 | Sutherland | 235/152 |
| 4,549,275 | 10/1985 | Sukonick | 364/521 |
| 4,694,404 | 9/1987 | Meagher | 364/518 |
| 4,736,306 | 4/1988 | Christensen et al. | 364/513 |
| 4,766,556 | 8/1988 | Arakawa | 364/522 |

OTHER PUBLICATIONS

Patent Abstracts of Japan, vol. 9, No. 133, "Arithmetic Device", by T. Yoshimura, Jun. 8, 1985, p. 362, 1856.
Article "An Introduction to Solid Modeling", 1988 Computer Science Press, Inc. by M. Mantyla pp. 345–364.

*Primary Examiner*—Phu K. Nguyen
*Attorney, Agent, or Firm*—Carl M. Wright

[57] ABSTRACT

Method for use in a CAD system whereby three-dimensional interferences among space-oriented objects can be rapidly determined by storing a reduced granularity of the design space in the form of a three-dimensional matrix having elements which represent identification numbers of objects which occupy the design space in the subcontinuum represented by the element. The element can be multidimensional or the element can refer to a table if more than one object occupies the associated subcontinuum. As objects are added to the drawing, the new objects are assigned unique index numbers which are stored in all the matrix elements corresponding to all the subcontinuums occupied by the object. Calculations for interference among pairs of objects need only be made between objects having their index number in a same element of the matrix.

2 Claims, 1 Drawing Sheet

METHOD FOR ENHANCING THREE-DIMENSIONAL INTERFERENCE CHECKING

BACKGROUND OF THE INVENTION

1. Field of the Invention

This invention relates to three-dimensional graphics, particularly to determining whether objects oriented in three dimensions but displayed in two dimensions overlap or interfere in the undisplayed dimension. Whether objects drawn in two dimensions overlap or interfere with one another in the two displayed dimensions can be visually verified. When the objects are oriented in three-dimensional space, interference is not discernible from the two-dimensional display. For example, in piping diagrams for architectural drawings, the pipes occupy three dimensions. As more pipes are added, it is necessary to know that one pipe does not interfere with a pipe that is already positioned.

2. Description of Related Art

The prior art method of ascertaining whether there is any interference between pairs of objects in three-dimensional drawings (two-dimensional layouts) depends on making two sets of drawings at the same time, each representing a different pair combination of the three-dimensional space, e.g., top and side views. This is difficult and time consuming, especially if many changes have to be made.

Another prior art method more adaptable to automated systems, i.e., computer-aided drafting (or design), known as CAD, is to calculate for each added object possible intersections with all the previous objects.

The mathematics for determining intersections of vectors are well known. For example, if the equations of two three-dimensional vectors have a simultaneous solution, then the vectors intersect at the coordinates represented by the simultaneous solution. Three-dimensional objects in space can be represented by combinations of vector equations and the intersection of any pair of vectors where one of the pairs is from one object and the other is from the other object reveals that the objects interfere with one another.

For objects that can be represented by combinations of polygons, the calculations for interference can be made by pair-wise determinations of the polygons of each pair of objects. An efficient algorithm for determining polygon intersections is described in *Algorithms for Graphics and Image Processing* by Theo Pavlidis (Computer Science Press 1982) at pages 352 to 355.

The number of calculations required increases rapidly as the number and complexity of the objects increase. For example, if the number of polygons for the i-th object is n(i) and there are m objects, the number of calculations (each requiring many arithmetical operations) is the sum of m products, each product being the number n(k) of each k-th object times the sum of all n(j) objects where j is one less than k.

Examples of the increase can be shown by noting that for three cubes (comprising six polygons each), 108 calculations would be required and the addition of a fourth cube increases the number to 216, double the number of calculations. For two cubes and two spheres (represented by dodecagons, i.e., twelve pentagons), the number of calculations is 468 and the addition of another sphere increases the figure to 900, almost double the number of calculations. Because the number of calculations increases with an increase in the number of polygons used to compose an object, the increase in time for making the calculations mitigates against using more complex but better represented objects.

SUMMARY OF THE INVENTION

In accordance with the invention, a three-dimensional array is stored in memory in a CAD system, each element representing a subsection (subcontinuum) of the entire three-dimensional space of interest, called the design space. As objects are drawn or inserted to the design space, an index number or tag is assigned and the index or tag is stored in each element of the three-dimensional array corresponding to the subcontinuums occupied by the object. If any element contains a non-zero entry, then calculations need be made for interference only between the object being entered and the object identified by the index stored in the element. If the elements all have zero entries for the added object, then it cannot interfere with any of the other objects and no calculations need be made.

BRIEF DESCRIPTION OF THE DRAWING

The invention is described in detail by referring to the various figures which illustrate specific embodiments of the invention, and wherein like numerals refer to like elements.

DESCRIPTION OF THE PREFERRED EMBODIMENT

Figure 1:
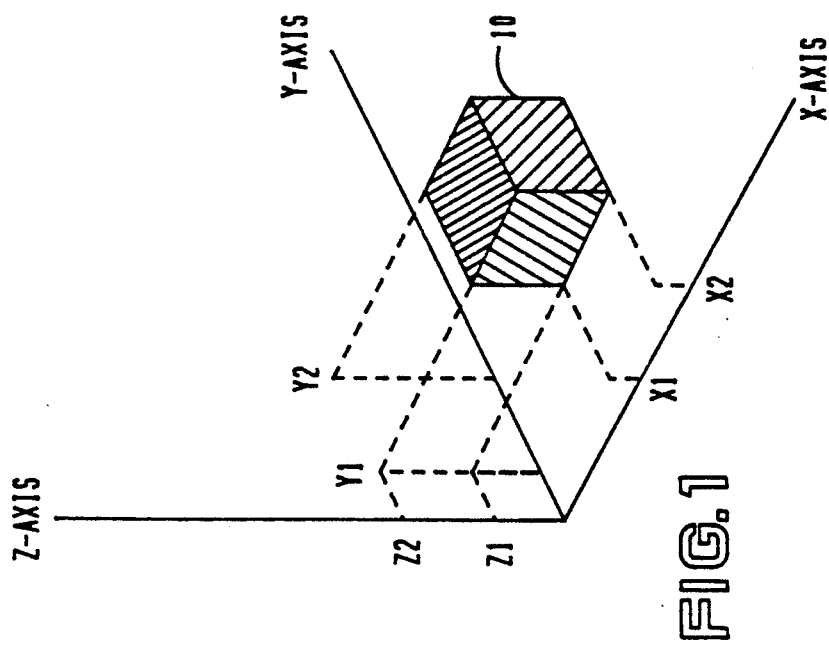
FIG. 1 is an isometric representation showing a subcontinuum in a design space.

In FIG. 1, a subsection of the design space (subcontinuum) 10 is shown as a cube in the design space (the total three-dimensional space of interest) defined by the X-, Y-, and Z-axes. The vertices of the subcontinuum 10, which define its location, are the points P1(X1,Y1,Z1), P2(X2,Y1,Z1), P3(X2,Y1,Z2), P4(X1,Y1,Z2), P5(X1,Y2,Z1), P6(X2,Y2,Z1), P7(X2,Y2,Z2), and P8(X1,Y2,Z2). The entire design space is subdivided into similar, adjacent subcontinuums which are preferably cubic but need not be so.

The X-Y plane of the design space comprises n×m pels (picture elements) where n and m are usually some power of two. For illustrative purposes, it will be assumed that the design space is divided into 1024 pels along each axis. (2*10=1024 where * represents exponentiation.) Therefore, the entire design space is divided into 1024*3 or approximately one billion pels.

The displayed two-dimensional representation is usually the X-Y plane, requiring only 1024*2 or approximately one million pels. Since a pel can be represented by a one or zero when using two-color displays (black and white), only 131,072 bytes are required to represent the display area in two dimensions. (More than 134 million bytes would be required to store the entire design space if all the pels were to be stored.)

When an object is drawn in the design space, it is stored in one of a number of ways. For example, a data base scheme can be used where the vertices of the object are stored. Alternatively, the object can be stored as a series of vectors. The prior art literature explains the many options commonly used.

If the objects occupy three dimensions, calculations can be performed to determine whether objects interfere, i.e., intersect or overlap, with one another. Interference among objects in the design space can also be determined by storing an index value (tag) for each object in every array element of a matrix representing the pels in three dimensions occupied by the object. Since several bytes would be required for each array element, the memory requirements become prohibitive and the time required for storage and retrieval excessive.

According to the invention, the interference checking problem is simplified by setting up an array representing the design space in reduced granularity. In the illustrative example, an element in an array represents a cube of eight pels along each axis. That is, an eight by eight by eight pel cube, called a subcontinuum, is represented by an element in the array. Only about two million elements are required to be stored and retrieved.

When an object is entered into the design space, its index or tag is stored in every element representing the subcontinuums occupied by the object. If the element contains a nonzero entry, then a possibility of an interference with another object is indicated. The other objects can be identified by entries in the element or in a table pointed to by the entry in the element. The second approach is preferred to reduce the size of the array. That is, a nonzero entry in an element points to a table which lists the indices or tags of the objects that occupy the subcontinuum.

Using the information in the table, calculations need be made only between the objects listed as occupying the same subcontinuum and such calculations need only be made for the polygons or vectors of the objects that are in the same subcontinuum. The calculations required to determine interference among objects are thereby greatly reduced. When an object occupies a subcontinuum having a corresponding element storing a zero value, then no calculation is required at all.

Figure 2:
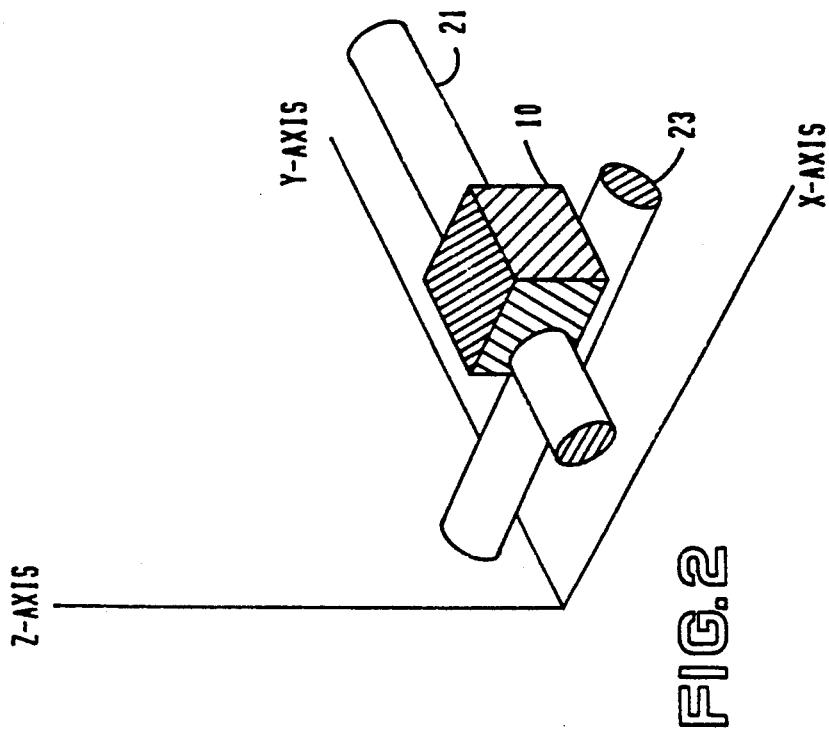
FIG. 2 is an isometric representation of two pipes in the design space, one passing through the subcontinuum and the other not.

In FIG. 2, for example, the pipe 23 is shown as not passing through a particular subcontinuum 10. When the pipe 21 is added to the design space, it passes through the subcontinuum 10 which is the only subcontinuum through which the pipe 23 could pass in common with the pipe 23. In this case, no calculations to determine interference are required.

While the invention has been particularly shown and described with reference to a preferred embodiment thereof, it will be understood by those skilled in the art that various changes and modifications in form and details may be made therein without departing from the spirit and scope of the invention according to the following claims.

What is claimed is:

1. In a graphics system for representing in two dimensions three-dimensional objects oriented in space, said system including steps for determining whether the objects interfere with one another, the improvement comprising the steps of:
    assigning a unique index to each object as each object is oriented in the space;
    storing the index of each object in a location associated with each subcontinuum of the space occupied by each object; and
    making the determination whether the objects interfere with one another only among those objects having an associated index in the same locations.

2. A method for rapidly determining the intersection of objects in a three-dimensional space comprising the steps of:
    specifying parameters defining successive objects;
    identifying each object with a object tag;
    storing representations of said specified objects in a format which preserves the objects' three dimensionality;
    storing in predetermined cells of a three-dimensional array the tags of successive objects as specified, each cell corresponding to a subcontinuum of the three-dimensional space and each predetermined cell representing a subcontinuum through which the corresponding object passes; and
    calculating possible object intersections between objects having tags in the same cells of the three-dimensional array.

* * * * *